United States Patent [19]

Gwynne

[11] 3,964,944

[45] June 22, 1976

[54] MANUFACTURE OF CEMENTITIOUS BOARD

[75] Inventor: Thomas Gwynne, Loughborough, England

[73] Assignee: United States Gypsum Company, Chicago, Ill.

[22] Filed: Nov. 6, 1973

[21] Appl. No.: 413,289

[52] U.S. Cl................................ 156/40; 52/631; 156/202; 156/245; 156/257; 156/268; 264/333; 428/70; 428/192
[51] Int. Cl.²...................... B32B 1/04; B32B 31/18
[58] Field of Search............... 156/39, 40, 216, 257, 156/268, 202, 245; 52/631; 161/43, 44, 104; 264/333; 428/70, 192

[56] References Cited
UNITED STATES PATENTS

| | | | |
|---|---|---|---|
| 1,671,084 | 5/1928 | Meyercord | 52/631 |
| 1,750,621 | 3/1930 | Brookby | 156/39 X |
| 1,846,881 | 2/1932 | Lewis | 52/631 |
| 2,213,249 | 9/1940 | Kelley | 156/202 X |
| 3,241,276 | 3/1966 | Vance et al. | 52/605 X |
| 3,435,582 | 4/1969 | Disney et al. | 52/417 X |
| 3,563,843 | 2/1971 | Wagers et al. | 161/133 |

Primary Examiner—William J. Van Balen
Assistant Examiner—Henry F. Epstein
Attorney, Agent, or Firm—Samuel Kurlandsky; Donnie Rudd; Kenneth E. Roberts

[57] ABSTRACT

The invention relates to the manufacture of cementitious board, such as gypsum board, faced with paper or other sheets and having an improved accuracy of edge profile. A sheet to be folded at the lateral edges of the board is scored, and quick-setting adhesive, preferably a hot melt adhesive, is applied along the lines of folding. The sheet is then folded to the desired configuration and held until the adhesive has set thus establishing an accurate profile that withstands the action of the aqueous slurry of cementitious material and the application of the other sheet. The invention can be applied to various profiles, including square edge, tapered edge, rebated and tongue-and-groove.

3 Claims, 5 Drawing Figures

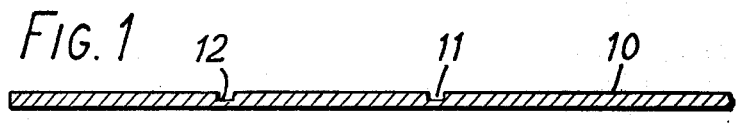
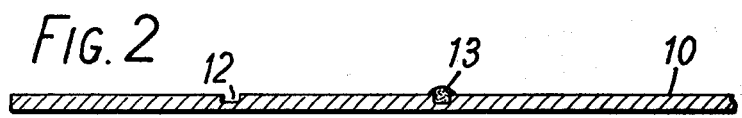
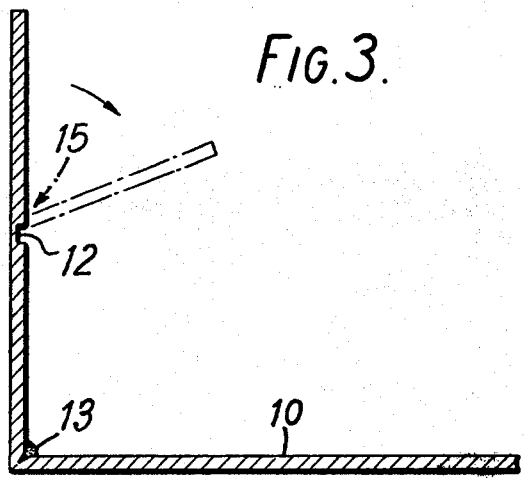
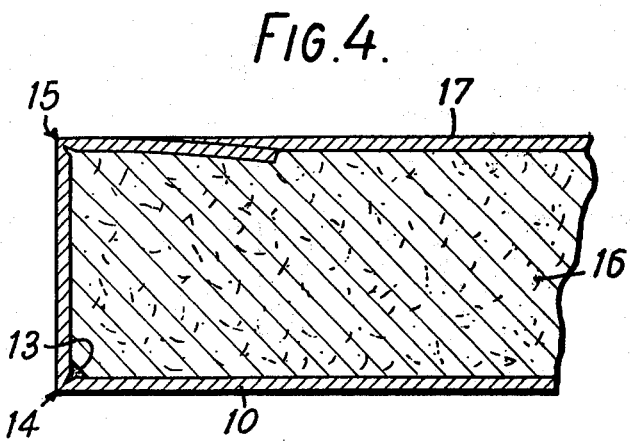

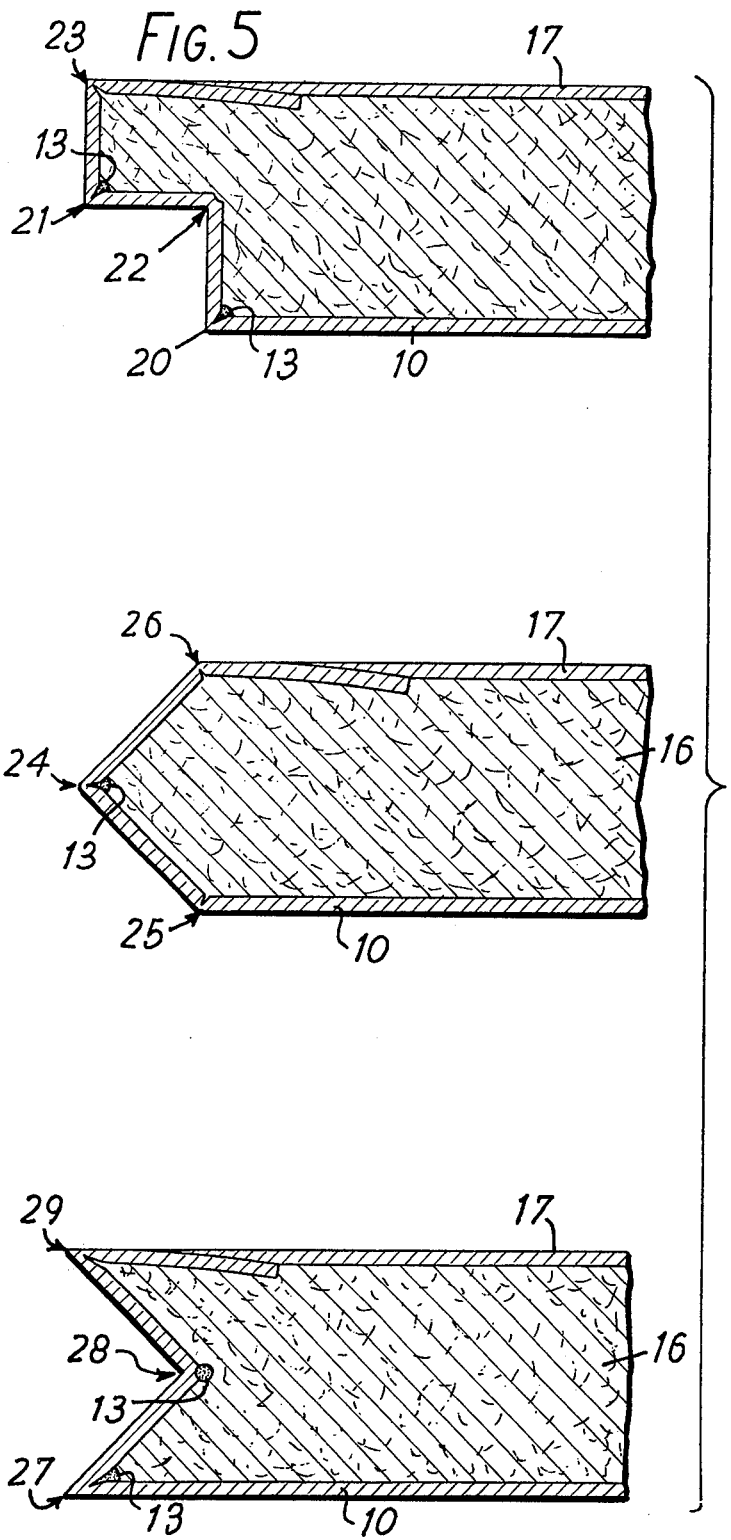

MANUFACTURE OF CEMENTITIOUS BOARD

The present invention relates to the manufacture of cementitious board and more especially paper-lined plasterboard.

In the manufacture of lined board of cementitious material, it is customary to fold up the edges of an advancing lower lining sheet, which usually constitutes the front face of the board, and to deposit on the sheet an aqueous slurry of the cementitious material which is subsequently covered by an upper lining sheet and the board then formed to the required cross-sectional dimensions. For dry construction lining systems, conventional paper-covered cementitious board, in which the edges of the lower lining sheet are commonly scored to facilitate folding, provide edges which are satisfactory when the junction formed at abutting edges of adjacent boards is either concealed by a joint filling system (giving a flush surface) or by suitable cover strips. However, if it is desired to dispense with such methods of concealing the junction formed by the abutting edges of adjacent boards, then a very high degree of accuracy is required in forming the board edges to ensure that an unobtrusive, hairline junction is formed.

It is an object of this invention to provide means whereby more accurate edges can be provided in lined cementitious board.

According to this invention, the lower lining sheet is scored at its edge regions along lines where sharp folds are to be made, at least one line or band of a quick-setting adhesive is applied to the edge regions of the sheet in the parts thereof to be folded, and the edge regions are then folded to provide at least part of the final edge configuration of the board and are maintained in this configuration until they are fixed therein by setting of the adhesive.

The adhesive, which for convenience and speed of setting is preferably a hot melt adhesive, may be applied as one or more lines or beads along scored regions of the sheet, or in the form of one or more broad bands, possibly covering more than one score line. A variety of edge profiles can be preformed, wholly or partly, in this way, and the form of the edge folds bonded with adhesive is maintained through the board forming process.

In the case of square-edged boards, two folds are made in each edge region of the lower lining sheet, an inner fold defining the edge of the front face of the board and an outer fold where the extreme edge of the paper is turned inwardly for the edge region of the upper sheet to be secured thereto. Although this outermost fold can be made and secured with quick-setting adhesive as described above, it is preferred that it should be merely scored and folded in the conventional way, because it has been found that spreading of slurry onto the inwardly directed edge portion and consequent interference with the bond between the two sheets is thereby avoided. It is to be understood that the invention can equally be applied to other edge profiles, for example, rebated edge, bevelled edge, tongued edged or grooved edged adopting normal board forming techniques. With slight modifications to normal techniques, more specialised profiles can also be produced.

Accordingly, a preferred embodiment of the present invention is characterised by removing part of the thickness of the lower lining sheet along the lines of intended folds in the edge region of the lower sheet, applying a quick-setting adhesive along at least one of such lines other than the outermost at each edge, folding the edge regions to provide part of the final edge configuration of the board, and maintaining the edge regions in this configuration until the adhesive sets.

It will also be apparent that the invention provides a lined cementitious board comprising a core of set cementitious material, for example gypsum, faced with a lining of sheet material, for example paper, which is folded to define the edge profile of the board, at least one such fold, and preferably all folds other than the outermost in a given sheet, including a line or band of set adhesive bonding the sheet material at the fold in the desired folded configuration.

The following is one example illustrating the practice of this invention, reference being had to the accompanying drawing in which FIGS. 1 to 4 show diagrammatically successive stages in the edge forming procedure, and FIG. 5 shows three further board edge profiles embodying the invention.

In the manufacture of paper-lined plasterboard, the lower lining sheet 10 of "cream" or "ivory" paper, is scored with two score lines 11 and 12 along each longitudinal edge. For the purposes of the invention the scoring cutters are set lower than is customary so that the scoring is deeper and part of the material of the sheet is removed to form grooves or channels, either along the inner lines 11 or along both inner and outer lines 11 and 12, as shown in FIG. 1.

A hot molten adhesive 13, preferably with a melting point of 150–200°C, is then applied, for example by means of a heated spreader head or wheel applicator, in a continuous stream along the scored grooves. As mentioned above, and as shown in FIG. 2, it is preferred that adhesive should not be applied to the outer score line 12.

Before the adhesive 13 has fully set, the paper passes through a forming device which turns up the edge of the paper at the inner score line until the edge region of the paper is at right angles to the body of the sheet, in which position the bead of adhesive sets and fixes the accurately formed angle at the corner 14, as shown in FIG. 3. The outer edge of the sheet is further folded along the score line 12, as shown in chain-dotted lines, but in the absence of adhesive the upper corner 15 remains flexible.

An aqueous slurry of gypsum plaster 16, which may contain additives common in plasterboard manufacture, is then deposited on the lower sheet 10, a top sheet of "grey" paper 17, the edge of which has been thinned, is applied over the lower sheet and slurry, and the slurry and lining sheets formed to the desired cross-section of the board, for example by means of a master or gauging roll. In this operation, the adhesive bead 13 keeps the corner 14 in its accurately right-angled condition, and the resulting board, as shown in FIG. 4, exhibits edges having sharply defined arrises.

The flexibility of the unbonded corner 15 avoids spread of the slurry onto the outer surface of the edge portion of the sheet 10 where it might interfere with the bonding of the upper sheet 17 to the lower. The absence of adhesive from this corner 15 does not substantially detract from the regularity of the edge; it has been found that preforming the lower corner 14 in the manner described is sufficient to confer regularity on the entire edge.

The improvement is particularly valuable with boards laminated with a decorative veneer such as coloured vinyl sheeting, since the application of printing materials to conceal gaping or irregular joints is particularly undesirable in this case.

Similar results can be achieved with other edge profiles, and the improved regularity enables very close abutment of adjacent similar boards to be achieved. FIG. 5 shows in partial cross-section three such profiles, similar reference numerals being used for similar features. The first profile is a rebated edge, in which the adhesive 13 is used to fix the folded corners 20 and 21, the facing sheet 10 at the corners 22 and 23 being scored but not secured by adhesive. The second and third profiles are respectively a tongued and a grooved edge, the former being formed with one bead of securing adhesive 13 at the corner 24 but simple scoring at the corners 25 and 26, while the latter is formed with beads of adhesive 13 at the inner and re-entrant folds 27 and 28 but once again none at the outer fold 29.

I claim:

1. A method for the manufacture of a planar lined board of cementitious material including the steps of:
    scoring a lower lining sheet at its edge regions along lines where folds are to be made;
    advancing said lower sheet in a generally horizontal plane;
    applying substantially solely to said edge regions of said lower sheet in the parts thereof to be folded at least one line or band of quick-setting adhesive;
    folding the edges of said advancing sheet to provide at least part of the final edge configuration of the board and maintaining said regions in said configuration until fixed therein by setting of said adhesive;
    depositing an aqueous slurry of cementitious material on said advancing sheet;
    covering said slurry with an advancing upper lining sheet;
    and forming the resulting board to required cross-sectional dimensions.

2. The method of claim 1 wherein said scoring step comprises removal of part of the thickness of said lower sheet along the lines of intended folds and said adhesive is applied along the line of at least one such fold other than the outermost at each edge.

3. The method of claim 1 wherein said adhesive is a hot melt adhesive.

* * * * *